(12) United States Patent
Soyama (10) Patent No.: US 8,359,756 B2
(45) Date of Patent: Jan. 29, 2013

(54) SCRIBING APPARATUS AND SCRIBING METHOD

(75) Inventor: Masanobu Soyama, Suita (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 0 days.

(21) Appl. No.: 13/147,504

(22) PCT Filed: Feb. 22, 2010

(86) PCT No.: PCT/JP2010/001130
§ 371 (c)(1),
(2), (4) Date: Aug. 2, 2011

(87) PCT Pub. No.: WO2010/098058
PCT Pub. Date: Sep. 2, 2010

(65) Prior Publication Data
US 2011/0283552 A1  Nov. 24, 2011

(30) Foreign Application Priority Data
Feb. 24, 2009  (JP) .................................. 2009-040354

(51) Int. Cl.
*B43L 13/00* (2006.01)

(52) U.S. Cl. ........................................................ 33/18.1

(58) Field of Classification Search .................. 33/18.1, 33/32.1, 32.3, 41.1, 41.3
See application file for complete search history.

(56) References Cited

U.S. PATENT DOCUMENTS

| | | | |
|---|---|---|---|
| 2007/0180715 A1* | 8/2007 | Nishio | 33/18.1 |
| 2007/0199968 A1* | 8/2007 | Nishio | 225/93 |
| 2007/0228616 A1* | 10/2007 | Bang | 264/405 |
| 2009/0308219 A1* | 12/2009 | Yamamoto et al. | 83/880 |
| 2011/0318877 A1* | 12/2011 | Akiyama | 438/113 |
| 2012/0133041 A1* | 5/2012 | Phee et al. | 257/737 |
| 2012/0171814 A1* | 7/2012 | Choi et al. | 438/107 |

FOREIGN PATENT DOCUMENTS

| | | |
|---|---|---|
| JP | 5-238542 A | 9/1993 |
| JP | 2001-322824 A | 11/2001 |
| JP | 2002-20133 A | 1/2002 |
| JP | 2005-33018 A | 2/2005 |
| JP | 2007-114721 | 5/2007 |
| JP | 2008-80349 A | 4/2008 |
| JP | 2008-85275 A | 4/2008 |
| WO | 2005/028172 A1 | 3/2005 |
| WO | 2007/004700 A1 | 1/2007 |

* cited by examiner

Primary Examiner — G. Bradley Bennett
(74) Attorney, Agent, or Firm — McGlew and Tuttle, P.C.

(57) ABSTRACT

An object is to scribe a small-sized substrate made of a brittle material with high workability. A plurality of brittle material-made substrates 107a to 107i are arranged on the table 106 while being positioned by their respective positioning pins 109. A recipe data table is prepared in advance for each of the brittle material-made substrates on an individual basis. On the basis of the recipe data table, the brittle material-made substrate and the scribing head are moved relatively to each other to perform inside scribing or outside scribing on each of the substrates. This makes it possible to subject a plurality of substrates to scribing operation at one time under automatic control.

8 Claims, 8 Drawing Sheets

| Scribe line | Scribe method | Pitch |
|---|---|---|
| a – f | 0 | 0 |
| r – g | 0 | 0 |
| q – h | 0 | 0 |
| p – i | 0 | 0 |
| o – j | 0 | 0 |
| OS1 | 1 | 5 |
| a – o | 0 | 0 |
| b – n | 0 | 0 |
| c – m | 0 | 0 |
| d – l | 0 | 0 |
| e – k | 0 | 0 |
| f – j | 0 | 0 |
| OS2 | 1 | –5 |

FIG. 9

SCRIBING APPARATUS AND SCRIBING METHOD

TECHNICAL FIELD

The present invention relates to a scribing apparatus and a scribing method used particularly in the cutting of a substrate made of a brittle material such as a low-temperature co-fired ceramic substrate.

BACKGROUND ART

A low-temperature co-fired ceramic (hereafter referred to as "LTCC") substrate is constructed by performing conductor wiring on sheets obtained by mixing an aggregate of alumina and a glass material thereby to form a multilayer film, followed by firing the multilayer film at a temperature as low as about 800 deg. C. In terms of practical use, the LTCC substrate comprises a single mother board on which a plurality of functional areas are formed simultaneously in a lattice pattern, and the mother board is divided into separate small substrates on a functional area-by-functional area basis. Heretofore it has been customary to use a cutting tool whereby the mother board is broken into pieces by means of mechanical cutting.

Moreover, in order to achieve fragmentation of a glass substrate or the like, as disclosed in Patent Document 1, the substrate made of such a brittle material is scribed by a scribing apparatus first, and is whereafter cut into pieces along the resulting scribe lines. In this description, the term "scribing" refers to an operation to engrave scribe lines (guide lines for cutting) on a substrate made of a brittle material by rolling a scribing wheel over the substrate in a mutually pressure-contact state. The substrate formed with the scribe lines can be fragmented readily simply by causing development of a vertical crack (a crack which runs in the direction of thickness of the substrate).

[Patent Document 1] International Publication WO 2005/028172A1

DISCLOSURE OF THE INVENTION

[Problems to be Solved by the Invention]

In a scribing apparatus of conventional design, a single brittle material-made substrate is held in place on a table in preparation for scribing. When the size of the brittle material-made substrate is small, scribing can be completed in a relatively short period of time. However, in the case of scribing a large number of brittle material-made substrates, much time and effort need to be spent on the retention of the brittle material-made substrates and the removal of the substrates after the completion of scribing.

The present invention has been devised to solve the problems associated with the conventional art as mentioned supra, and accordingly its object is to provide the capability of scribing small-sized substrates with enhanced workability.

[Means for Solving the Problems]

To solve the problems, a scribing apparatus of the present invention for scribing a brittle material-made substrate having functional areas formed thereon to facilitate division of the substrate into separate substrate products on a functional area-by-functional area basis, wherein an inside scribing to scribe said brittle material-made substrate from a position spaced inwardly of one edge of the substrate to a position spaced inwardly of the other edge of the substrate, and an outside scribing to scribe said brittle material-made substrate from a position spaced outwardly of one edge of the substrate to a position spaced outwardly of the other edge of the substrate are employed, comprises: a table on which a plurality of said brittle material-made substrates are arranged while being positioned; a scribing head mounted face to face with the brittle material-made substrate placed on said table for free up-and-down motion, a front end of which is formed with a scribing wheel; a moving section for allowing relative movement of said scribing head and the brittle material-made substrate under a condition where said scribing wheel is kept pressed against the surface of said brittle material-made substrate; and a controller, in which are stored recipe data tables provided with data on scribe lines to be drawn and corresponding scribing methods and assigned separately to said individual brittle material-made substrates, for performing scribing operation in accordance with the scribing methods of different types by effecting control of said moving section in a manner to allow relative movement of said scribing head and the brittle material-made substrate, as well as to raise and lower said scribing head, on the basis of said recipe data tables.

In the scribing apparatus, said table may be provided with a plurality of positioning pins capable of positioning of a plurality of said brittle material-made substrates.

In the scribing apparatus, said scribing wheel may be a scribing wheel with high penetrability.

To solve the problems, a scribing method of the present invention for scribing a brittle material-made substrate having functional areas formed thereon with use of a scribing head which is free to move up and down to facilitate division of the substrate into separate substrate products on a functional area-by-functional area basis, wherein an inside scribing to scribe said brittle material-made substrate from a position spaced inwardly of one edge of the substrate to a position spaced inwardly of the other edge of the substrate, and an outside scribing to scribe said brittle material-made substrate from a position spaced outwardly of one edge of the substrate to a position spaced outwardly of the other edge of the substrate are employed, comprises the steps of: providing in advance a recipe data table for each of a plurality of brittle material-made substrates on an individual basis, said recipe data table containing data on scribe lines to be drawn and corresponding scribing methods; arranging and positioning a plurality of brittle material-made substrates on a table; and scribing each of said brittle material-made substrates in accordance with the scribing methods of different types by moving said scribing head and the brittle material-made substrate relatively to each other and raising and lowering said scribing head on the basis of said recipe data tables.

[Advantageous Effects of the Invention]

According to the present invention having such features, a plurality of small-sized brittle material-made substrates can be put all together on a table so as to be scribed by one operation under automatic control. This makes it possible to save a person in charge who operates the scribing apparatus from having to do a lot of work, and thereby achieve improvement in workability.

EXPLANATION OF REFERENCE SYMBOLS 100 scribing apparatus
101 movable base
102a, 102b guide rail
103 ball screw
104, 105 motor
106 table
107, 107a to 107i substrate made of brittle material
108a, 108b CCD camera
109 positioning pin
110 bridge
111a, 111b support column
112 scribing head
113 linear motor
114 holder
115 scribing wheel
120 controller
121 image processing section
122 control section
123 input section
124 Y motor driver
126 turning motor driver
127 scribing head driver
129 recipe data storage section

BEST MODES FOR CARRYING OUT THE INVENTION

Figure 1:
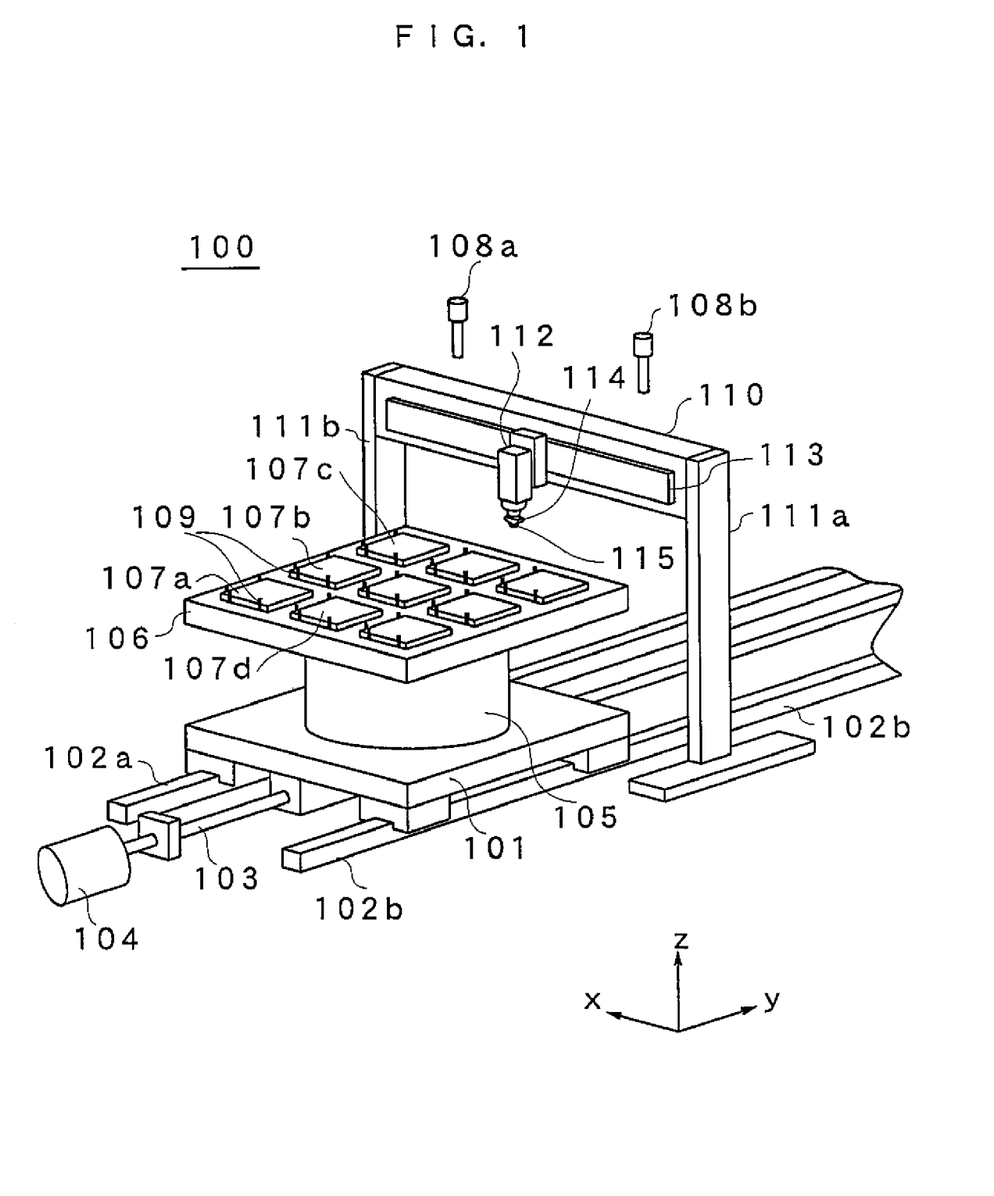
FIG. 1 is a perspective view showing a scribing apparatus in accordance with an embodiment of the invention.

FIG. 1 is a schematic perspective view showing an example of a scribing apparatus in accordance with an embodiment of the present invention. In the scribing apparatus 100, a movable base 101 is mounted for free movement in a y-axis direction along a pair of guide rails 102a and 102b. A ball screw 103 threadedly engages the movable base 101. The ball screw 103 is rotated by the actuation of a motor 104, thereby allowing the movable base 101 to move in the y-axis direction along the guide rails 102a and 102b. On the top surface of the movable base 101 is disposed a motor 105 for turning a table 106 on an x-y plane so that the table can be positioned at a predetermined angle. On the table 106 are placed a plurality of brittle material-made substrates 107, for example, low-temperature co-fired ceramic substrates. The substrates are held in place by means of vacuum suction or otherwise (not represented graphically). Above the scribing apparatus are disposed two CCD cameras 108a and 108b for taking images of alignment marks of each brittle material-made substrate 107.

Figure 2:
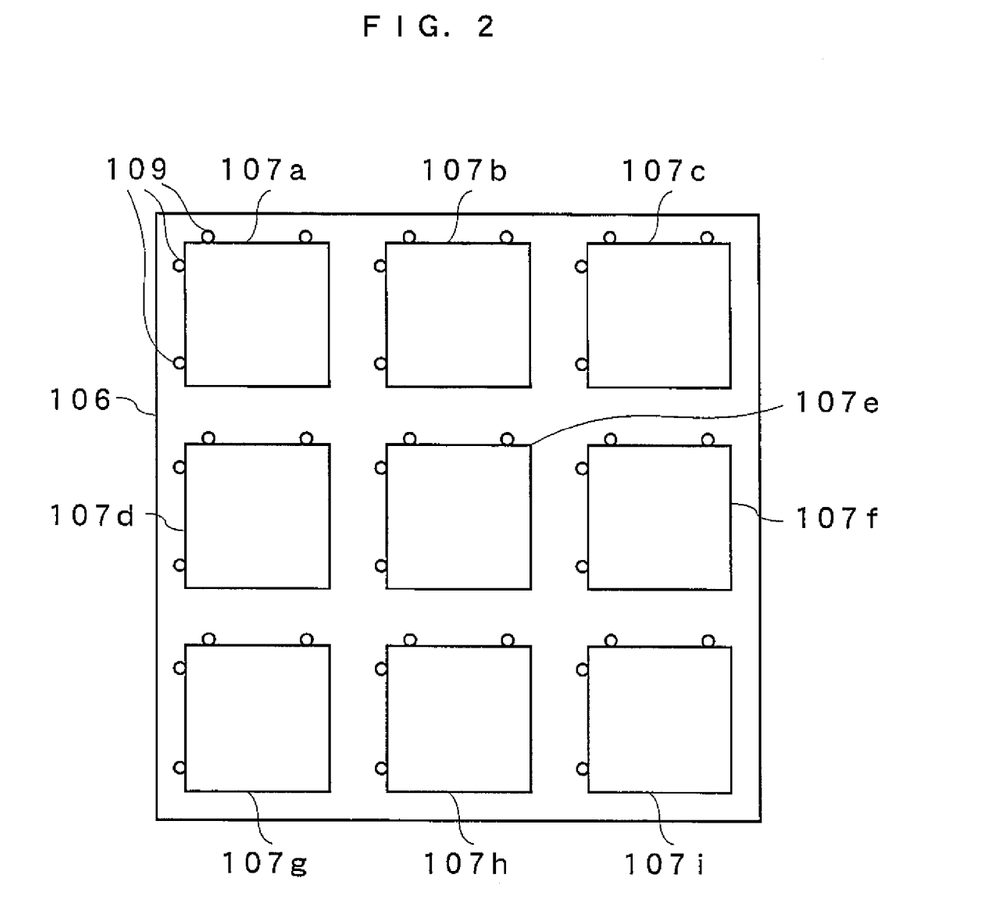
FIG. 2 is a view showing a table and brittle material-made substrates in accordance with the embodiment.

Next, the table 106 and the brittle material-made substrate placed on the top surface thereof will be described with reference to FIG. 2. As shown in FIG. 2, a plurality of, in this example, nine brittle material-made substrates 107a to 107i are put all together on the table 106 so as to be arranged at a predetermined spacing. In order to achieve positioning of the nine brittle material-made substrates 107a to 107i, four positioning pins 109 are disposed perpendicularly to the x-y plane on the table 106 on a substrate-by-substrate basis. A user puts the brittle material-made substrate on the table, with two sides thereof contacted by the nine positioning pins 109 for positioning.

In the scribing apparatus 100, a bridge 110 extending along an x-axis direction is laid across support columns 111a and 111b so as to straddle the movable base 101 and the table 106 placed above the movable base 101. In the bridge 110, a scribing head 112 is held so as to be moved freely by a linear motor 113. The linear motor 113 drives the scribing head 112 to move rectilinearly along the x-axis direction. A scribing wheel 115 is attached to the front end of the scribing head 112 via a holder 114. The scribing head 112 draws a scribe line by rolling the scribing wheel 115 on the surface of the brittle material-made substrate in a mutually pressure-contact state under an adequate load.

As the scribing wheel 115, a highly penetrative scribing wheel as disclosed in Japanese Patent No. 3074153 is desirable for use. Therefore a scribing wheel of this type is used in this embodiment. For example, the scribing wheel having high penetrability can be obtained by forming grooves of predetermined depth with a predetermined pitch at the cutting edge of an ordinary scribing wheel in common use. For example, the commonly-used ordinary scribing wheel is fabricated by forming V-shaped blades along the circumference of a disk-shaped wheel. In general, the convergent angle of the V-shaped blade is set at an obtuse angle, for example, an angle of greater than or equal to 90-degree, preferably an angle of greater than or equal to 95-degree, or more preferably an angle of greater than or equal to 100-degree, while being set at an angle of less than or equal to 160-degree, preferably an angle of less than or equal to 150-degree, or more preferably an angle of less than or equal to 140-degree. For example, the V-shaped blade is formed by grinding the disk-shaped wheel circumferentially so as to form an outer peripheral portion. For example, the V-shaped blades formed by grinding operation have the form of minute serrations resulting from grinding marks. In order to fabricate a highly penetrative scribing wheel, deeper recesses (grooves), each of which extends beyond the valley part of the serration at the cutting edge of an ordinary scribing wheel, are arranged at regular intervals at the cutting edge. For example, the depth of the groove is greater than or equal to 2 μm, preferably greater than or equal to 3 μm, or more preferably greater than or equal to 5 μm, while being less than or equal to 100 μm, preferably less than or equal to 50 μm, or more preferably less than or equal to 20 μm. For example, the width of the groove is greater than or equal to 10 μm, preferably greater than or equal to 150 μm, or more preferably greater than or equal to 20 μm, while being less than or equal to 100 μm, or preferably less than or equal to 50 μm. The pitch of the grooves is, given that the scribing wheel has a diameter in a 1 mm to 10 mm range (especially in a 1.5 mm- to 7 mm range) for example, set to fall in a range from 20 μm to 250 μm, preferably from 30 μm to 180 μm, or more preferably from 40 μm to 80 μm. The pitch takes on a value obtained by summing the length of a single groove in a direction circumferentially of the scribing wheel and the length of a single protrusion resulting from formation of the groove. In a highly penetrative scribing wheel, in general, the length of a single groove is longer than the length of a single protrusion in the circumferential direction of the scribing wheel. Exemplary of the material of construction of the scribing wheel are sintered diamond (PCD), cemented carbide, and the like. In the interest of a long service life of the scribing wheel, sintered diamond (PCD) is desirable for use.

In this construction, the movable base 101, the guide rails 102a and 102b, the table 106, the motors 104 and 105 for driving them, and the linear motor 113 for driving the scribing head 112 constitute a moving section for effecting relative movement of the scribing head and the brittle material-made substrate within the range of the plane of the substrate.

Figure 3:
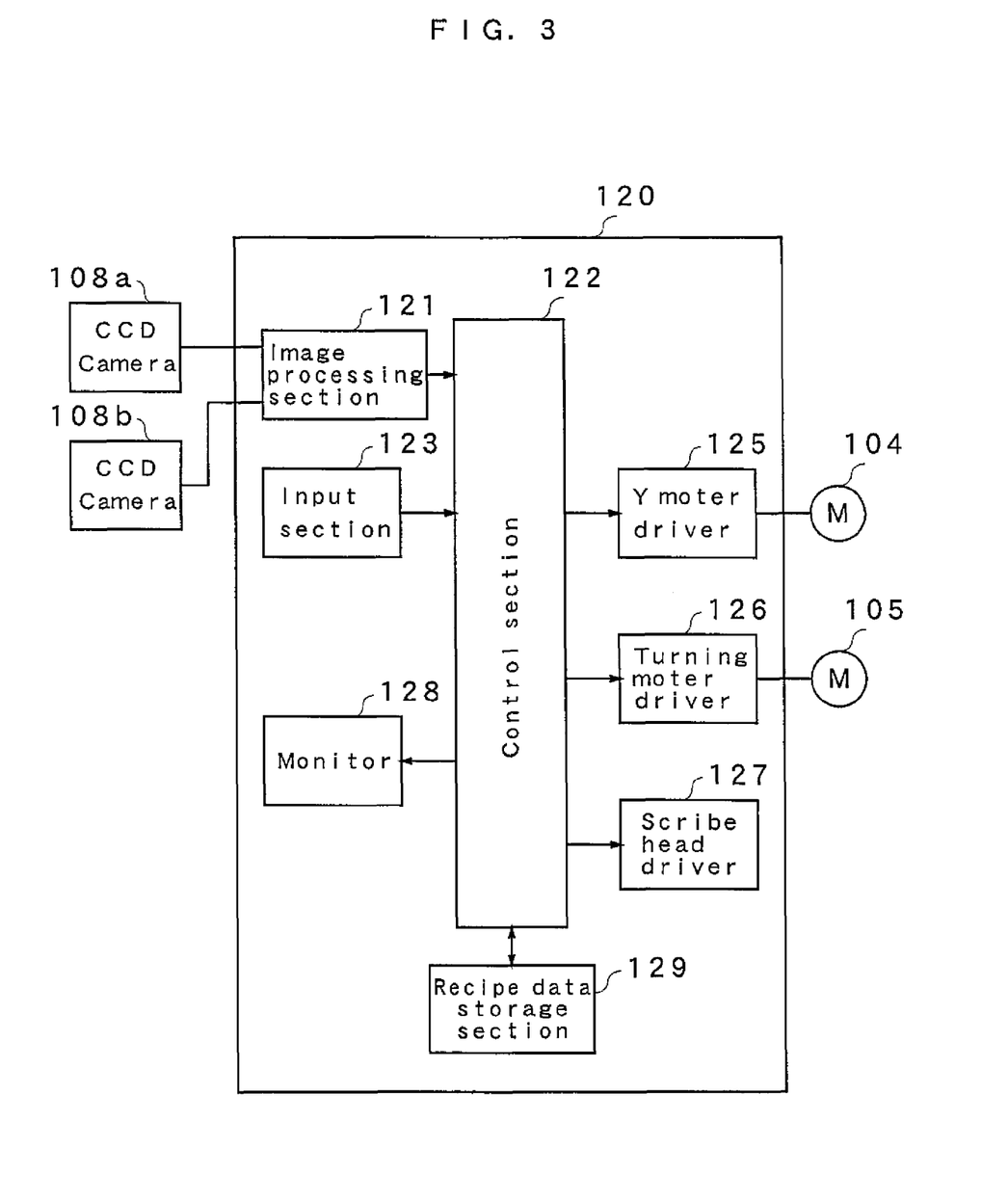
FIG. 3 is a block diagram showing a controller in accordance with the embodiment.

Next, the configuration of a controller of the scribing apparatus 100 in accordance with the embodiment will be described with reference to a block diagram. FIG. 3 is the block diagram of the controller 120 of the scribing apparatus 100. In the diagram, output from the two CCD cameras 108a and 108b is fed, through an image processing section 121 of the controller 120, to a control section 122. An input section 123 is provided for the input of recipe data about scribing of the brittle material-made substrate, which will hereafter be described. The control section 122 is connected with a Y motor driver 125, a turning motor driver 126, and a scribing head driver 127. The Y motor driver 125 drives the motor 104. The turning motor driver 126 drives the motor 105. On the basis of the recipe data, the control section 122 controls the position of the table 106 in the y-axis direction and exercises turning control over the table 106. Moreover, under the control of the control section 122, the scribing head 112 is driven to move in the x-axis direction by the scribing head driver 127, and also the scribing wheel 115 is driven to roll over the surface of the brittle material-made substrate in a mutually pressure-contact state under an adequate load. In addition, the control section 122 is connected with a monitor 128 and a recipe data storage section 129. The recipe data storage section 129 stores therein recipe data tables a to i for scribing the nine brittle material-made substrates 107a to 107i, respectively. The recipe data is inputted through the input section 123 while being monitored by the monitor 128.

Next, two different scribing techniques, namely outside scribing and inside scribing, adopted in the scribing apparatus in accordance with this embodiment will be described. Firstly, according to the outside scribing, the brittle material-made substrate is scribed from one lateral side to the other lateral side. More specifically, referring to FIG. 4, in the outside scribing, the scribing wheel 115 is set in a position spaced outwardly a slight distance from one end of the brittle material-made substrate 107, and is lowered until its lowermost part comes to a position slightly lower than the top surface of the brittle material-made substrate 107. Then, the scribing wheel 115 is moved horizontally toward the right, as viewed in the figure, under a predetermined scribing pressure. In this way, the brittle material-made substrate 107 is scribed from one edge to the other edge. In the case of the outside scribing, since the resulting scribe line extends from one edge to the other edge of the substrate, it follows that the substrate can be fragmented (broken) readily after scribing operation. Moreover, the outside scribing is free from the problem of a slip of the scribing wheel at the scribing starting point. However, the negative side is that the scribing wheel is susceptible to wear.

Figure 5:
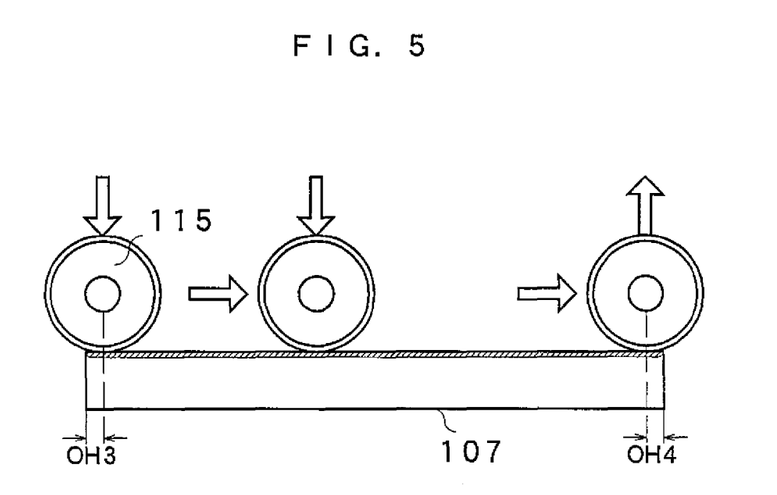
FIG. 5 is a view showing an inside scribing process for a brittle material-made substrate.

On the other hand, in the inside scribing, as shown in FIG. 5, the scribing wheel 115 is set and lowered in a position spaced inwardly a slight distance from one edge of the brittle material-made substrate 107, and is then moved horizontally toward the right, as viewed in the figure, under a predetermined scribing pressure. In this way, scribing is started from within the brittle material-made substrate 107. In the inside scribing, the brittle material-made substrate 107 is scribed from a position spaced inwardly from one edge to a position spaced inwardly from the other edge. That is, the brittle material-made substrate 107 is not scribed at its opposite lateral edge.

In the inside scribing, the scribing wheel is lowered in a position spaced inwardly from one edge of the brittle material-made substrate 107. In this case, a vertical crack resulting from scribing operation is likely to have a shallow depth. With this in view, in this embodiment, a cutting edge having high penetrability is used for the scribing wheel 115. Accordingly, even in the case of the inside scribing, a sufficiently deep vertical crack can be developed.

Figure 6:
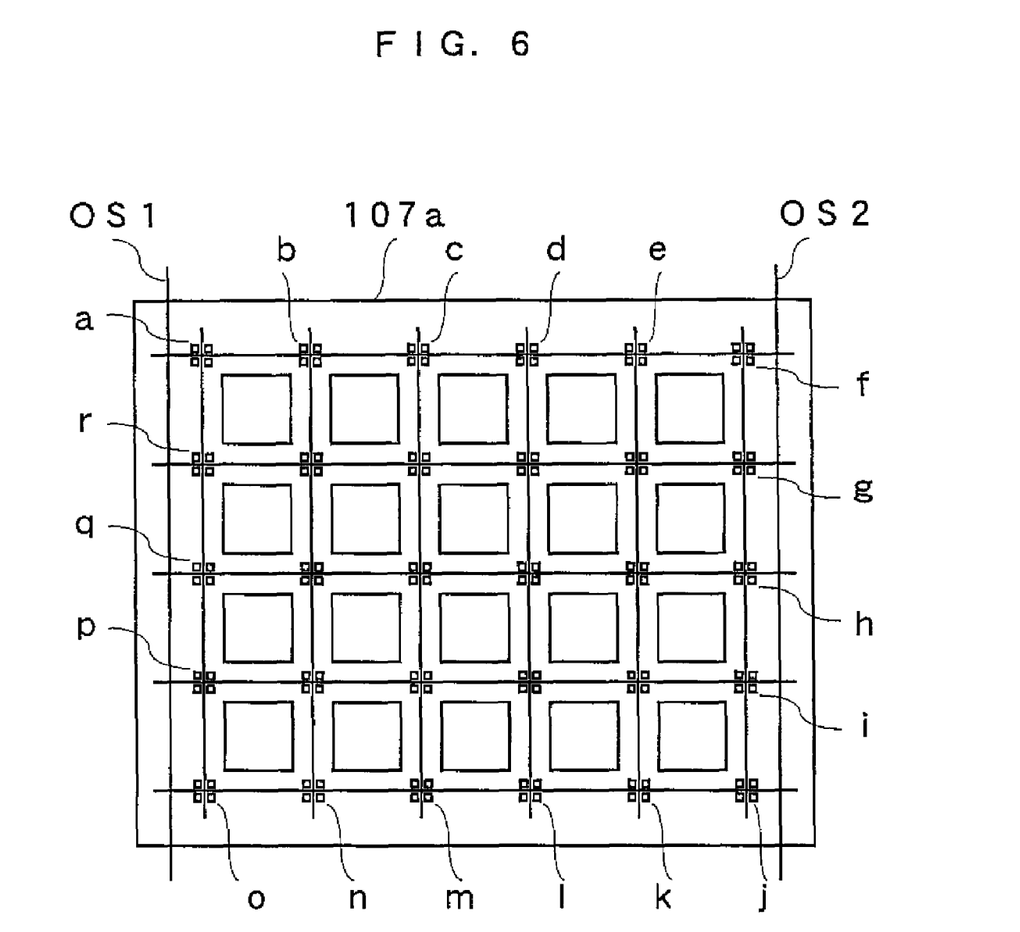
FIG. 6 is a view showing a yet-to-be-scribed brittle material-made substrate in accordance with the embodiment.

Next, an example of scribing operation will be described with reference to drawings. In this embodiment, scribing operation is conducted while adopting the outside scribing and the inside scribing separately for individual scribe lines. FIG. 6 is a diagram showing a single brittle material-made substrate 107a and twenty functional areas formed in a lattice pattern on the surface of the substrate. In addition, as shown in the diagram, the substrate bears previously formed alignment marks located among the functional areas. Out of the alignment marks, the ones arranged along the periphery of the substrate are indicated with symbols a to r, respectively.

Figure 4:
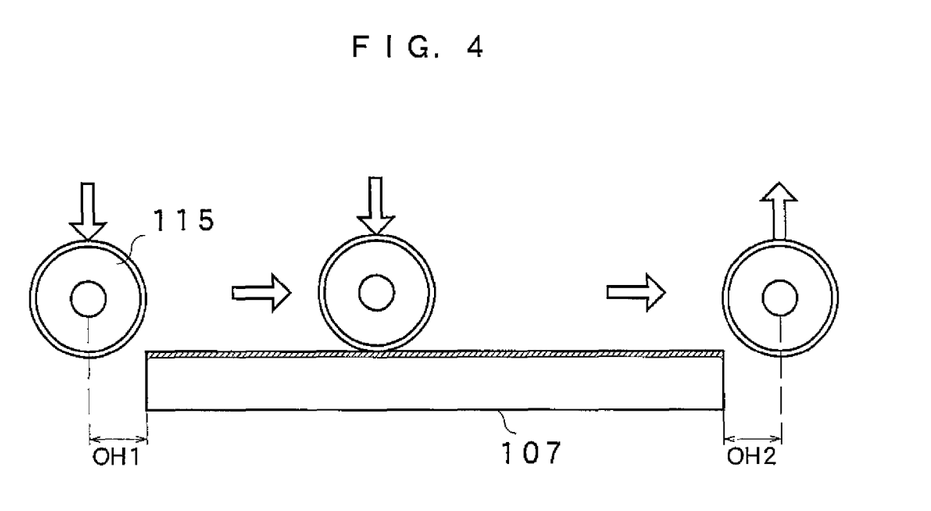
FIG. 4 is a view showing an outside scribing process for a brittle material-made substrate.
Figure 7:
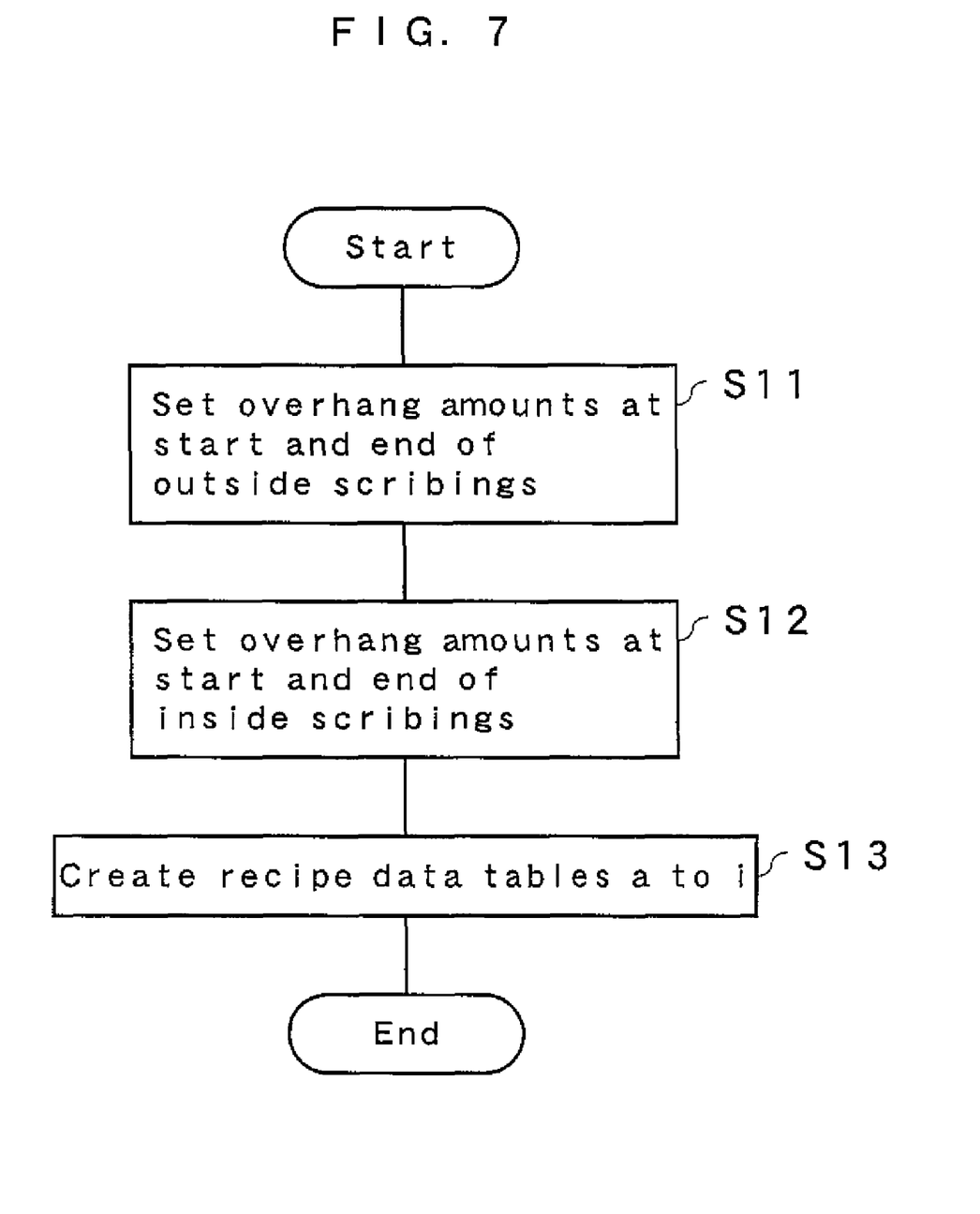
FIG. 7 is a flow chart showing procedural steps for determination of overhang amounts and creation of recipe data tables prior to scribing.

Next, the operation of the scribing apparatus in accordance with this embodiment will be described with reference to a flow chart. As shown in FIG. 7, to begin with, the amount of an overhang is determined prior to scribing operation, and a recipe data table is created. As has already been described, there are two different scribing techniques, namely the inside scribing and the outside scribing, wherefore the amount of an overhang is determined for each of the inside scribing and the outside scribing on an individual basis. In step S11, as shown in FIG. 4, an overhang amount OH1 at the start of the outside scribing and an overhang amount OH2 at the end of the outside scribing are determined. As employed herein, "overhang amount" refers to the distance from the edge of the substrate to the lowering or rising position of the scribing head. As for the outside scribing, the amount of an overhang is set to a positive value. For example, when the overhang amount for the starting of scribing and the overhang amount for the ending of scribing are each set at +5 mm, then the scribing wheel is lowered in a position spaced outwardly a distance of 5 mm from one edge of the substrate, and is whereafter raised at a position spaced outwardly a distance of 5 mm from the other edge of the substrate. In this way, the outside scribing can be accomplished. In step S12, as shown in FIG. 5, an overhang amount OH3 at the start of the inside scribing and an overhang amount OH4 at the edge of the inside scribing are determined. As for the inside scribing, the amount of an overhang is set to a negative value. For example, when the overhang amount for the starting of scribing and the overhang amount for the ending of scribing are each set at −2 mm, then scribing is started in a position spaced inwardly a distance of 2 mm from one edge of the substrate, and is ended at a position spaced inwardly a distance of 2 mm from the other edge of the substrate. In this way, the inside scribing can be accomplished.

Figure 8:
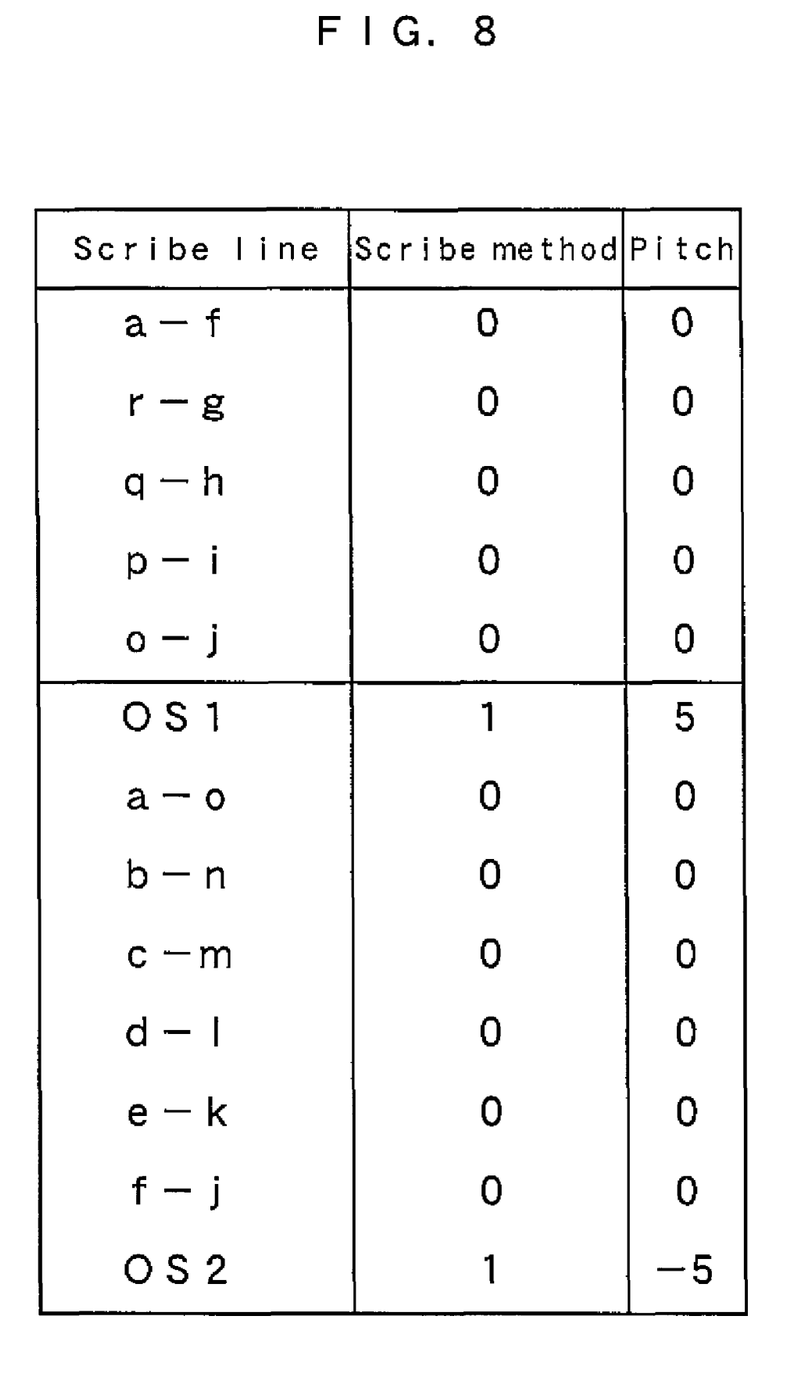
FIG. 8 is a view showing an example of the recipe data table.

Next, the procedure proceeds to step S13 to create recipe data tables. Although it is possible to provide a recipe data table for each of the brittle material-made substrates arranged all together on an individual basis, so long as a recipe data table is rendered common to all of the substrates, there is no need to create recipe data tables separately for the individual substrates. The following description deals with a recipe data table for a single substrate. For example, as shown in FIG. 8, the recipe data table provides a summary of scribe lines and the corresponding scribing methods and pitches. In this data table, there are listed: a line extending from an alignment mark a to an alignment mark f of the brittle material-made substrate 107a shown in FIG. 6 (scribe line a-f), and other parallel lines extending from alignment marks r to g, q to h, p to i, and o to j, respectively corresponding to the inside scribing. The table further shows a scribe line OS1 corresponding to an outside scribing; lines extending from alignment marks a to o, b to n,,, f to j, corresponding to the inside scribing; and a scribe line OS2 corresponding to the outside scribing.

Moreover, each scribing method is assigned one of numerals 0, 1, and 2. In the table, the scribing method 0 refers to the inside scribing, which is applied to scribing operation to draw the line extending from the alignment mark a to the alignment mark f, as well as to draw the scribe lines r-g, q-h, p-i, and o-j arranged in parallel with the scribe line a-f. The scribing method 1 refers to the outside scribing without the use of alignment marks. The scribing method 2 refers to the outside scribing with use of alignment marks as the reference for specific alignment. The scribing method 2 can be specified as the outside scribing for a brittle material-made substrate having previously formed alignment marks located in such areas as are subject to the outside scribing.

Further, the pitch refers to the amount of parallel displacement from a scribing reference line, which is given in millimeters (mm). The reference line is a line connecting a pair of alignment marks or a line conforming to an edge of the substrate. In the inside scribing, a line connecting alignment marks generally serves as a scribing reference line, wherefore the pitch may be given a value of 0 in this case. Accordingly, in the inside scribing to draw the scribe lines a-f, r-g,,, and o-j, as well as the scribe lines a-o, b-n,,, and f-j, the pitch is set at 0. Meanwhile, in the outside scribing based on the scribing method 1, the amount of displacement from the edge of the substrate serving as the reference line is given in millimeters, for example. In the recipe data table shown in FIG. 8, where the scribe line OS1 under the outside scribing is concerned, the scribing method 1 is specified, and the pitch is set at 5 mm as the amount of displacement from the reference line. Likewise, where the scribe line OS2 under the outside scribing is concerned, the scribing method 1 is specified, and the pitch is set at −5 mm.

By setting the absolute value of the amount of an overhang in the inside scribing to be smaller than the absolute value of the pitch in the outside scribing, it is possible for a scribe line corresponding to the inside scribing, which is perpendicular to a scribe line corresponding to the outside scribing, to be intersected by a scribe line corresponding to the outside scribing. For example, in the foregoing case, the absolute value of the overhang amount in the inside scribing is 2, and the absolute value of the pitch in the outside scribing is 5. Therefore, as shown in FIG. 6, the lines extending from the alignment mark a to f, r to g,,, can be intersected by the scribe lines OS1 and OS2.

Figure 9:
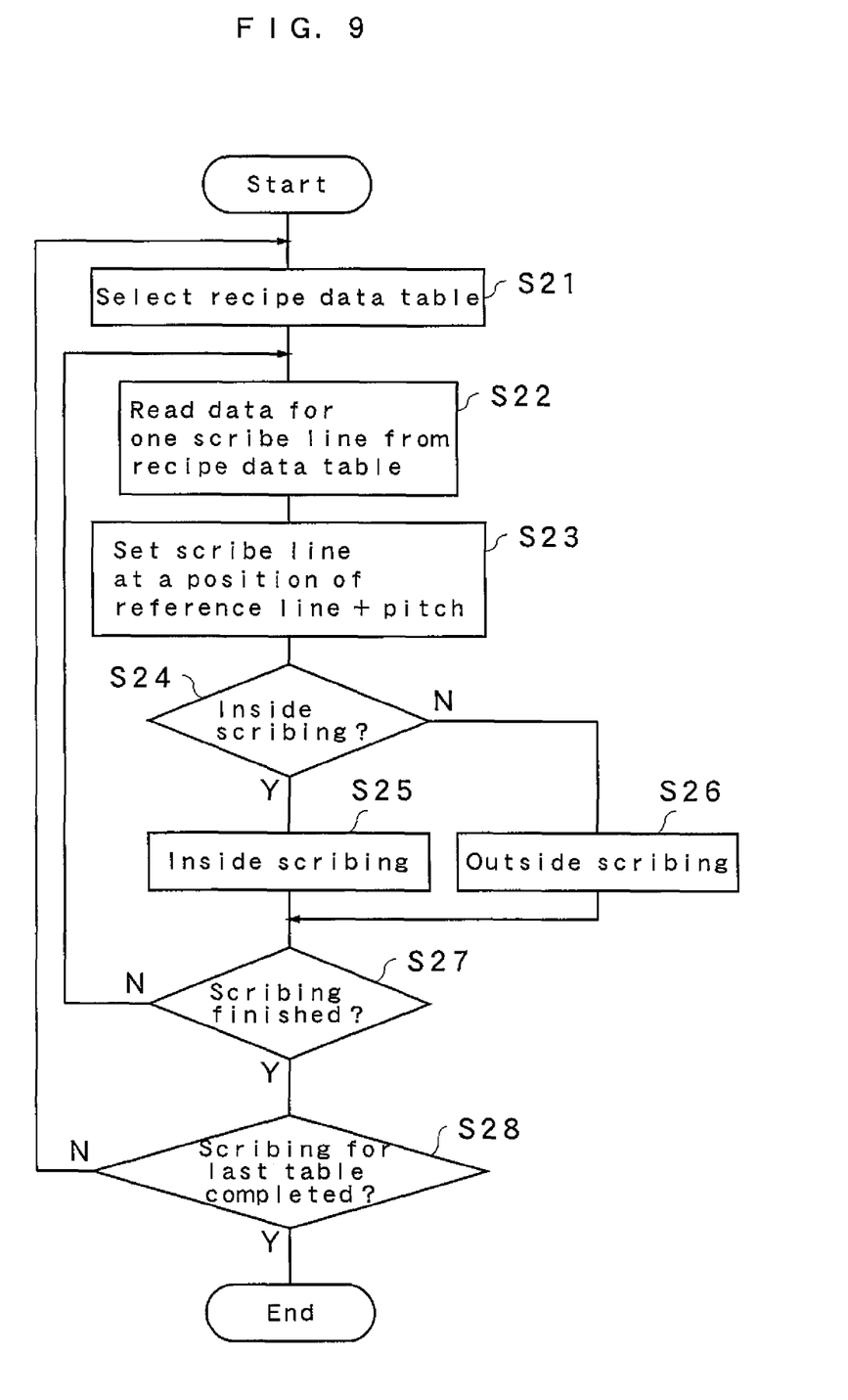
FIG. 9 is a flow chart showing procedural steps for scribing operation effected by the scribing apparatus in accordance with the embodiment.

Now, scribing operation which is conducted after the creation of the recipe data table thus far described will be explained with reference to a flow chart shown in FIG. 9. At the outset, the nine brittle material-made substrates 107a to 107i are placed on the table 106, with their two sides kept against the four positioning pins 109. Upon start-up of scribing operation, in step S21 as a first step, a previously stored recipe data table a for a single brittle material-made substrate, for example the substrate 107a, is selected and retrieved. From this recipe data table, the data of one scribe line is read out (step S22). For example, when the recipe data table a is such as shown in FIG. 8, the data of the line running from the alignment mark a to the alignment mark f is read out. Then, in step S23, this line is set as a scribe line in a position displaced with respect to a reference line by the amount of the pitch. In this case, since the line connecting the alignment marks in itself is the reference line and the pitch takes on a value of 0, it follows that the line connecting the alignment marks becomes the scribe line. Thus, under the control of the control section 122, the table 106 is moved in the y-axis direction and is also turned on as needed basis. Moreover, the scribing head 112 is positioned in such a manner as to draw the scribe line when moved in the x-axis direction by the linear motor 113.

Following the completion of the setting operation, in step S24, scribing method data is retrieved to select either one of the inside scribing and the outside scribing. When the inside scribing is specified, the procedure proceeds to step S25 to effect the inside scribing. In this case, scribing is started at a start position allowing for the predetermined overhang amount OH3 for the starting of the inside scribing. In this way, scribing can be started from within the brittle material-made substrate 107a. After reaching an end position allowing for the predetermined overhang amount OH4 for the ending of the inside scribing, the scribing head is raised whereupon the scribing operation is completed. Then, the procedure proceeds to step S27 where it is determined whether or not each and every scribe line provided in the recipe data table a has been made up. If not, the procedure returns to step S22 to repeat the same procedural steps.

Following the completion of the inside scribing to draw the scribe lines a-f, r-g,,, and o-j on the basis of the recipe data table a, the outside scribing is performed to draw the scribe line OS1. In this case, the motor 105 is actuated to give the table 106 a 90-degree turn. Moreover, the scribe line OS1 under the outside scribing conforms to a parallel line located in a position spaced inwardly only a distance of 5 mm from one edge of the substrate. In this case, the scribing method 1 is specified, wherefore scribing (lowering of the scribing head) is started at a position spaced outwardly a distance of the overhang amount OH1 set for the starting of the outside scribing from one end of the brittle material-made substrate, and is ended at a position spaced outwardly a distance of the overhang amount OH2 set for the ending of the outside scribing from the other end of the brittle material-made substrate. Then, the scribing head is raised. Subsequently, the inside scribing is performed to draw the scribe lines a-o, b-n,,, and f-j in the same manner as described earlier. Further, the outside scribing is performed to draw the scribe line OS2 in the same manner as described above in connection with the scribe line OS1. In this way, the brittle material-made substrate 107a can be scribed along the desired lines provided in the recipe data table a as shown in FIG. 8.

Next, in step S28, it is determined whether or not scribing operation based on the last recipe data table has been completed. If not, the procedure returns to step S21 to scribe the next brittle material-made substrate 107b. In a like manner, scribing operation is repeated to draw lines provided in a recipe data table b. After all of the substrates arranged on the table 106 have been so scribed, the procedure comes to an end.

It is noted that, in the case of arranging brittle material-made substrates only on part of the table 106 instead of arranging nine brittle material-made substrates on the table 106, it is advisable to specify the number of substrates in advance. Moreover, since the number of substrates placed on the table 106 can be identified by means of the CCD cameras, it is possible to carry out scribing operation while skipping procedural steps for a substrate-free region.

In this embodiment, the table is moved in the y-axis direction while being turned and the scribing head is moved in the x-axis direction by the moving section. Alternatively, the moving section may be designed to allow the table to move in both the x-axis direction and the y-axis direction. In another alternative, the scribing head may be configured to move in both the x-axis direction and the y-axis direction.

Moreover, in this embodiment, the brittle material-made substrate is illustrated as a low-temperature co-fired ceramic substrate. However, the present invention is applicable also to a substrate of any other type, such as a glass substrate for use in a liquid crystal panel, so long as the substrate is made of such size as that a plurality of them can be arranged on the table.

Further, in this embodiment, nine brittle material-made substrates can be arranged on the table. It is needless to say, however, that the number of the substrates is not limited to 9 but may be of any other number, for example, 4, or 16. Still further, by rendering the pins implanted on the table readily detachable from the table, it is possible to select the location and number of the pins in conformity with the size of the brittle material-made substrate. It is also possible to adopt a system in which brittle material-made substrates are arranged at a predetermined spacing on a table and the exact positions of the substrates are identified by a CCD camera. In this case, it is advisable that marks are printed on the table in advance.

[Industrial Applicability]

The present invention finds a wide range of applications involving formation of scribe lines on small-sized substrates made of a brittle material such as ceramic substrates including a low-temperature co-fired ceramic substrate and glass substrates.

The invention claimed is:

1. A scribing apparatus for scribing a brittle material-made substrate having functional areas formed thereon to facilitate division of the substrate into separate substrate products on a functional area-by-functional area basis, wherein an inside scribing to scribe said brittle material-made substrate from a position spaced inwardly of one edge of the substrate to a position spaced inwardly of the other edge of the substrate, and an outside scribing to scribe said brittle material-made substrate from a position spaced outwardly of one edge of the substrate to a position spaced outwardly of the other edge of the substrate are employed, comprising:
   a table on which a plurality of said brittle material-made substrates are arranged while being positioned;
   a scribing head mounted face to face with the brittle material-made substrate placed on said table for free up-and-down motion, a front end of which is formed with a scribing wheel;
   a moving section for allowing relative movement of said scribing head and the brittle material-made substrate under a condition where said scribing wheel is kept pressed against the surface of said brittle material-made substrate; and
   a controller, in which are stored recipe data tables provided with data on scribe lines to be drawn and corresponding scribing methods and assigned separately to said individual brittle material-made substrates, for performing scribing operation in accordance with the scribing methods of different types by effecting control of said moving section in a manner to allow relative movement of said scribing head and the brittle material-made substrate, as well as to raise and lower said scribing head, on the basis of said recipe data tables.

2. The scribing apparatus according to claim 1, wherein said table is provided with a plurality of positioning pins capable of positioning of a plurality of said brittle material-made substrates.

3. The scribing apparatus according to claim 1, wherein said scribing wheel is a scribing wheel with high penetrability.

4. The scribing apparatus according to claim 2, wherein said scribing wheel is a scribing wheel with high penetrability.

5. A scribing method for scribing a brittle material-made substrate having functional areas formed thereon with use of a scribing head which is free to move up and down to facilitate division of the substrate into separate substrate products on a functional area-by-functional area basis, wherein an inside scribing to scribe said brittle material-made substrate from a position spaced inwardly of one edge of the substrate to a position spaced inwardly of the other edge of the substrate, and an outside scribing to scribe said brittle material-made substrate from a position spaced outwardly of one edge of the substrate to a position spaced outwardly of the other edge of the substrate are employed, comprising the steps of:
   providing in advance a recipe data table for each of a plurality of brittle material-made substrates on an individual basis, said recipe data table containing data on scribe lines to be drawn and corresponding scribing methods;
   arranging and positioning a plurality of brittle material-made substrates on a table; and
   scribing each of said brittle material-made substrates in accordance with the scribing methods of different types by moving said scribing head and the brittle material-made substrate relatively to each other and raising and lowering said scribing head on the basis of said recipe data tables.

6. The scribing method according to claim 5, wherein said table is provided with a plurality of positioning pins capable of positioning of a plurality of said brittle material-made substrates.

7. The scribing method according to claim 5, wherein said scribing wheel is a scribing wheel with high penetrability.

8. The scribing method according to claim 6, wherein said scribing wheel is a scribing wheel with high penetrability.

* * * * *